UNITED STATES PATENT OFFICE 2,017,317

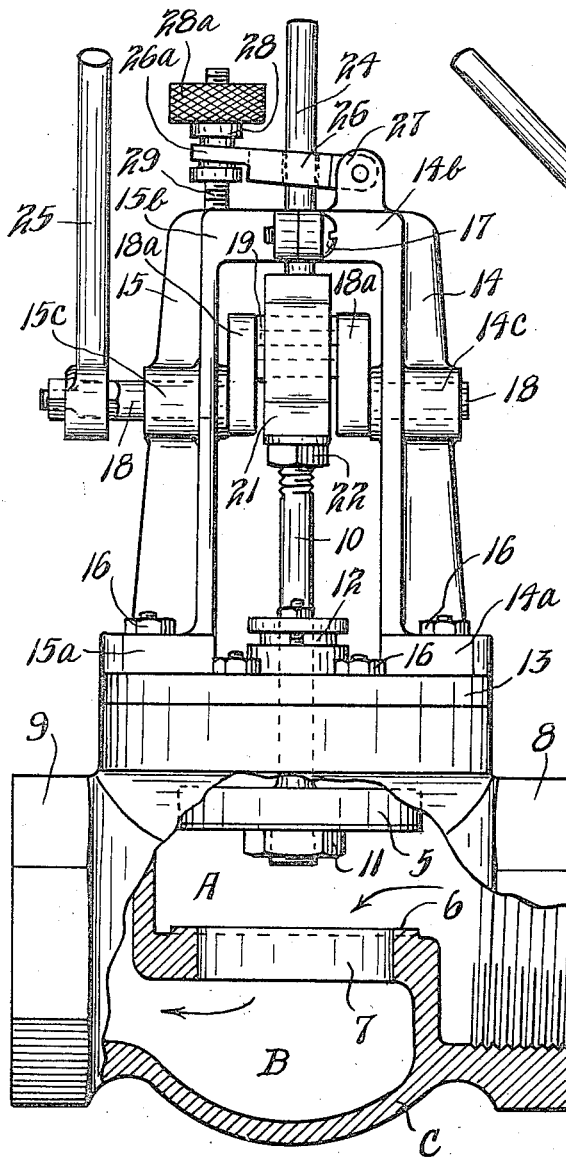
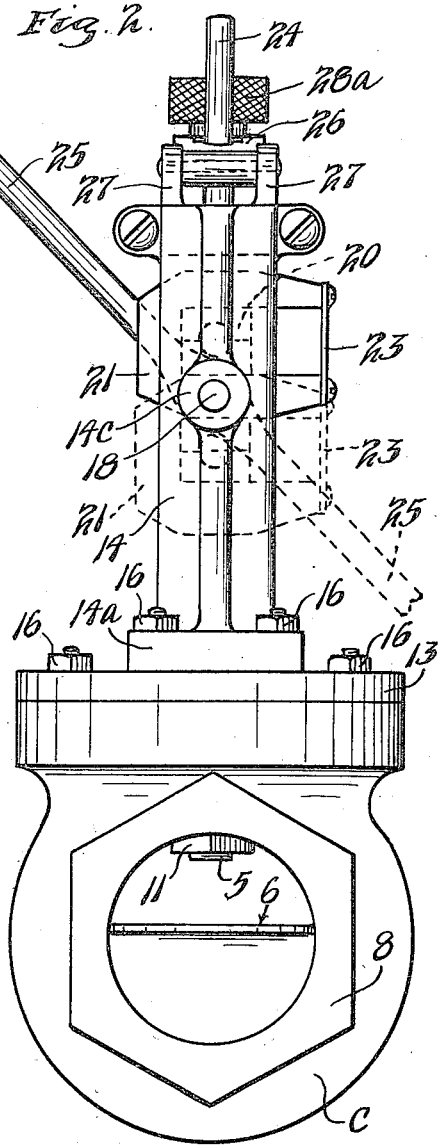
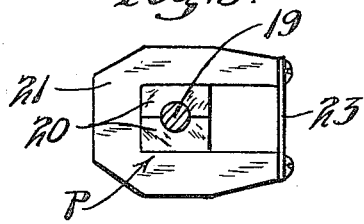

VALVE OPERATING MECHANISM

Leo Magney, Grand Forks, N. Dak., assignor of forty-five per cent to L. E. Ferguson, Grand Forks, N. Dak.

Application May 9, 1934, Serial No. 724,744

3 Claims. (Cl. 74—104)

This invention relates to mechanism for efficiently operating valves and the like and particularly to an operating mechanism which, through the turning of a crank, will effect a true rectilinear movement of a shank or stem of a valve without torsional or bending strain.

It is an object of my invention to provide an operating mechanism of the class described comprising a minimum number of parts and particularly adapted for efficiently opening and closing valves of the poppet and rectilinearly movable type.

A further object is the provision of such an operating mechanism which may be utilized to actuate relatively large valves with a minimum amount of effort or work.

A still further object is the provision in such a mechanism of means which may be adjusted to frictionally retain the valve in any one of a number of open and closed positions.

These and other objects and advantages of the invention will be more fully set forth in the following description made in connection with the accompanying drawing, in which like reference characters refer to similar parts throughout the several views, and in which:—

Fig. 1 is a side elevation of an embodiment of my invention, some portions being broken away and others shown in section;

Fig. 2 is an end elevation of the same, and

Fig. 3 is a detail view in cross section showing the split pillow in which the crank pin is journaled.

In the embodiment illustrated my operating mechanism is applied to a rectilinearly movable disk valve 5 which cooperates with an annular valve seat 6 surrounding a passage 7 formed in a partition between upper and lower chambers A and B. Chambers A and B are defined by a casting or other valve casing C and as shown this casing has an internally threaded inlet 8 and an internally threaded outlet 9. A valve stem 10 extends perpendicularly to the disk valve 5 and is secured thereto by means of a nut 11, the medial portion of said stem passing through a packing gland 12 which is mounted on a top plate 13, which plate is secured to the top of valve casing C.

An upstanding frame or mounting bracket for my valve operating mechanism is rigidly secured to top plate 13 and as shown comprises a pair of ribbed supports 14 and 15, respectively, having attachment feet 14a and 15a respectively which are secured to plate 13 by suitable means such as the nutted bolts 16. The upper ends of the ribbed supports 14 and 15 are provided with inturned arms 14b and 15b respectively which have opposing and registering abutment flanges and which are secured together by such means as the screws 17.

A crank shaft 18 is mounted between the upstanding supports 14 and 15 the ends thereof being journaled in suitable axially aligned bearings 14c and 15c respectively provided by said support members. Crank 18 has arms 18a and the crank pin 19 disposed between said supports, as clearly shown in Fig. 1. Crank pin 19 is journaled in a split bearing formed by a slidable pillow P which comprises the two complementary split pillow parts 20. Pillow P is slidable in a yoke 21 which is rigidly and adjustably affixed to the upper end of valve stem 10. As shown, yoke 21 is screw threaded to externally threaded upper end of valve stem 10 and a lock or jamb nut 22 is employed also threaded on stem 10 to maintain the yoke in a desired adjusted position. The inner faces of the jaws of yoke 21 are parallel and extend transversely to the axis of stem 10 and between said faces the pillow P is slidably mounted, said pillow being retained against endwise displacement in both directions by the crank arms 18a. A short strap or reinforcing plate 23 is secured across the outer ends of the jaws of yoke 21 maintaining said jaws in their properly spaced relation. The yoke 21 rigidly carries an upstanding guide rod 24 which is axially aligned with the valve stem 10 and which works through a suitable split slide bearing provided by the abutting faces of the arms 14b and 15b of the supporting frame.

Means for facilitating the turning or oscillation of crankshaft 18 is provided which, as shown, may comprise a rocker lever 25 non-rotatively secured to a projecting end of crank shaft 18 and disposed externally of the leg or supporting member 15. Adjustable retaining means working on a frictional or snubbing principle are employed at the top of the supporting frame and as shown take effect upon the guide rod 24. Such means may comprise a friction plate 26 preferably constructed of some metal or other material which is softer than the guide rod 24. Plate 26 is hinged, as shown, between spaced ears 27 integrally formed or otherwise secured to the upper end of supporting member 14. The plate is centrally apertured to receive the upstanding guide rod 24 and the outer or free end of the plate is provided with a yoke 26b which comprises a flanged collar 28 having threaded engagement with an upstanding screw post 29, said post being rigidly secured to the upper end of supporting member 15. Adjustment collar 28 rigidly carries a knurled knob or the equivalent 28a by which adjustment of the collar and the plate 26 may be facilitated.

Operation

The maximum possible movement of the disk valve 5 is, of course, equal to the maximum displacement of the crank wrist or pin 19. When crank shaft 18 is turned in one direction stem 10 and valve 5 are thrust downwardly to firmly seat the valve against its seat 6 without subjecting valve stem 10 or guide rod 24 to any bending or torsional strain. The pillow P slides smoothly in the yoke 21 to permit rectilinear movement of the valve and its stem. The turning of the crank shaft in the opposite direction of course lifts the valve rectilinearly again without placing the valve stem, yoke or guide rod under any bending strain.

An adequate degree of friction may be placed on the upper portion of the guide rod 24 by adjusting the angulation of friction plate 26 through the manipulation of the collar 28, for the purpose of frictionally retaining the valve in a closed position or in any number of desired open positions, within, of course, the limits of movement of the valve. Friction applied to guide rod 24 may be quickly varied as desired.

From the foregoing description it will be seen that I have provided a simple, rigid and highly efficient operating mechanism for effecting rectilinear movement of a valve or the like without subjecting the shank or stem to bending or torsional strain.

It will further be seen that with my improved structure relatively large and heavy valves may be actuated with a minimum amount of effort due to the leverage obtainable.

It will, of course, be understood that various changes may be made in the form, details, arrangement and proportions of the parts, without departing from the scope of my invention, which, generally stated, consists in a device capable of carrying out the objects above set forth and in the novel parts and combinations of parts disclosed and defined in the appended claims.

What is claimed is:—

1. In combination with a rectilinearly reciprocable valve or the like, an operating mechanism comprising a mounting, a cross head affixed to said reciprocable member and including a yoke disposed transversely of said reciprocable member, a guide rod secured to said cross head and disposed co-axially of said reciprocable member, a slide bearing on said mounting in which said guide rod works, a crank journaled in said mounting and disposed transversely of said reciprocable member, its axis traversing said cross head, said crank having crank arms straddling said cross head and having a crank pin confined in said yoke and means for facilitating the turning of said crank, and adjustable means on said mounting for frictionally engaging said guide rod to retain said reciprocable member in a number of different positions.

2. In combination with a rectilinearly reciprocable valve or the like, an operating mechanism comprising a yoke affixed transversely to said reciprocable member, a crank also disposed transversely of said reciprocable member but having its axis traversing said yoke, said crank having a crank pin confined in said yoke, a guide rod affixed to said yoke and disposed coaxially of said reciprocable member, a guide in which said rod works, a frictional retaining member pivoted at one of its ends adjacent said guide and embracing said guide rod and adjustable means for anchoring the opposite end of said frictional retaining member.

3. Operating mechanism for a rectilinearly reciprocable member having in combination a straight stem, a U-shaped yoke affixed to said stem defining a slot or guide having parallel straight lines extending transversely of said stem, a pillow of rectangular cross section slidably mounted in the slotted portion of said yoke, a frame straddling said U-shaped yoke and stem and having legs opposing said yoke, a guide rod fixed to the outer end of said yoke and disposed co-axially of said stem, a slide bearing mounted in said frame wherein said guide rod works, a crank disposed transversely of said stem and journaled in the legs of said frame and having a pair of crank arms respectively disposed on opposite sides of said yoke, said crank having a crank pin journaled in said pillow and means for facilitating the turning of said crank.

LEO MAGNEY.